United States Patent
Kuzumoto et al.

(10) Patent No.: US 9,410,079 B2
(45) Date of Patent: Aug. 9, 2016

(54) PHOSPHOR NANOPARTICLE AND OPTICAL DEVICE INCLUDING PHOSPHOR NANOPARTICLE

(71) Applicant: Sharp Kabushiki Kaisha, Osaka-shi, Osaka (JP)

(72) Inventors: Yasutaka Kuzumoto, Osaka (JP); Tatsuya Ryohwa, Osaka (JP); Makoto Izumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 121 days.

(21) Appl. No.: 14/526,585

(22) Filed: Oct. 29, 2014

(65) Prior Publication Data
US 2015/0129814 A1   May 14, 2015

(30) Foreign Application Priority Data
Nov. 8, 2013 (JP) ................... 2013-232151

(51) Int. Cl.
*C01B 21/06* (2006.01)
*C09K 11/02* (2006.01)
*C09K 11/56* (2006.01)
*C09K 11/61* (2006.01)
*C09K 11/62* (2006.01)
*C09K 11/70* (2006.01)

(52) U.S. Cl.
CPC ............ *C09K 11/025* (2013.01); *C09K 11/565* (2013.01); *C09K 11/615* (2013.01); *C09K 11/62* (2013.01); *C09K 11/70* (2013.01)

(58) Field of Classification Search
CPC .. C09K 11/02; C09K 11/025; H01L 51/0094; H01L 51/0062
See application file for complete search history.

(56) References Cited

FOREIGN PATENT DOCUMENTS

JP   2003-064278 A   3/2003

*Primary Examiner* — Carol M Koslow
(74) *Attorney, Agent, or Firm* — Keating & Bennett, LLP (57) ABSTRACT

A phosphor nanoparticle includes a nanoparticle core composed of a compound semiconductor, a shell layer that covers the nanoparticle core, and a modifying organic compound bound to the outer surface of the shell layer. The modifying organic compound exhibits absorption in at least part of a wavelength range of 300 nm or more and 400 nm or less.

8 Claims, 4 Drawing Sheets

PHOSPHOR NANOPARTICLE AND OPTICAL DEVICE INCLUDING PHOSPHOR NANOPARTICLE

BACKGROUND

1. Field

The present disclosure relates to a phosphor nanoparticle and an optical device including the phosphor nanoparticle.

2. Description of the Related Art

Semiconductor nanoparticles aggregate easily because of their high surface activity. To inhibit the aggregation of semiconductor nanoparticles, it is reported that semiconductor nanoparticles are modified with a protective agent.

For example, Japanese Unexamined Patent Application Publication No. 2003-64278 discloses semiconductor nanoparticles having reduced photocatalytic activity and good dispersibility in an organic matrix. In the semiconductor nanoparticles described in Japanese Unexamined Patent Application Publication No. 2003-64278, an organic compound having copolymerizability with a resin monomer or compatibility with a resin matrix is bonded to the surfaces of core-shell particles each including a semiconductor nanocrystalline core and an electrically conductive shell.

SUMMARY

It was found that when phosphor nanoparticles are formed by a technique described in Japanese Unexamined Patent Application Publication No. 2003-64278, the luminous efficiency is reduced.

The present disclosure has been accomplished in light of the foregoing respects. It is desirable to provide phosphor nanoparticles which are less likely to aggregate and which have excellent luminous efficiency.

The inventors have conducted intensive studies on a cause for a reduction in the luminous efficiency of phosphor nanoparticles when the phosphor nanoparticles are formed by the technique described in Japanese Unexamined Patent Application Publication No. 2003-64278 and have considered that the cause is the degradation of a nanoparticle core due to irradiation with ultraviolet radiation. According to an aspect of the disclosure, there is provided a phosphor nanoparticle including a nanoparticle core composed of a compound semiconductor, a shell layer that covers the nanoparticle core, and a modifying organic compound bound to the outer surface of the shell layer. The modifying organic compound exhibits absorption in at least part of a wavelength range of about 300 nm or more and about 400 nm or less.

An optical device includes the phosphor nanoparticle according to an embodiment of the present disclosure.

DESCRIPTION OF THE EMBODIMENTS

Hereinafter, a phosphor nanoparticle and an optical device according to embodiments of the present disclosure will be described below with reference to the attached drawings. In the attached drawings, the same or equivalent portions are designated using the same reference numerals. The dimensions, such as length, width, thickness, and depth, are appropriately changed for the clarification and simplification of the drawings and do not express the actual dimensions.

Structure of Phosphor Nanoparticle

Figure 1:
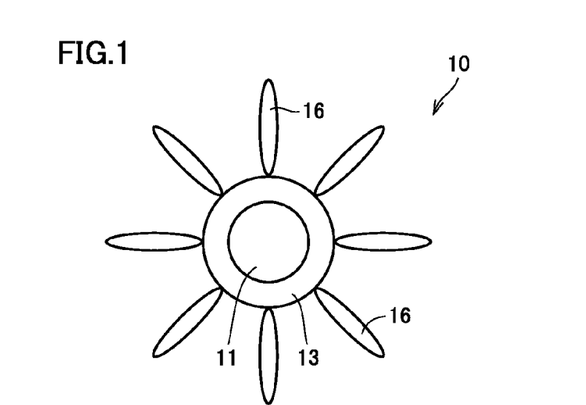
FIG. 1 is a schematic cross-sectional view of a structure of a phosphor nanoparticle according to an embodiment of the present disclosure.

FIG. 1 is a schematic cross-sectional view of a structure of a phosphor nanoparticle according to an embodiment of the present disclosure. A phosphor nanoparticle 10 according to this embodiment includes a nanoparticle core 11, a shell layer 13 that covers the nanoparticle core 11, and a modifying organic compound 16 bound to the outer surface of the shell layer 13. The modifying organic compound 16 exhibits absorption in at least part of a wavelength range of about 300 nm or more and about 400 nm or less. Thereby, the phosphor nanoparticles 10 are less likely to aggregate and have excellent luminous efficiency.

Specifically, in the phosphor nanoparticle 10 according to this embodiment, the modifying organic compound 16 is bound to the outer surface of the shell layer 13. This facilitates the separation of the phosphor nanoparticles 10 from each other, thus increasing the dispersibility of the phosphor nanoparticles 10. Thus, the phosphor nanoparticles 10 are less likely to aggregate.

Figure 2:
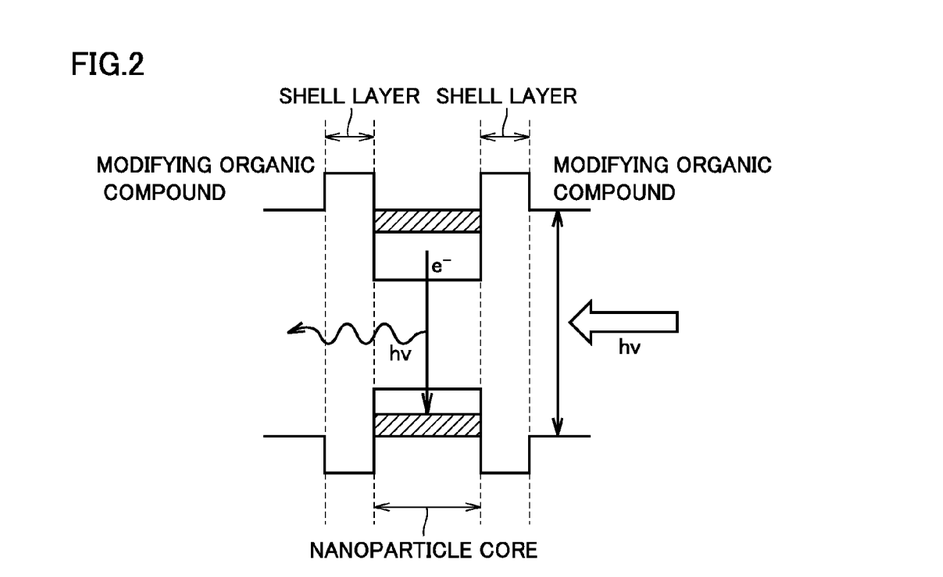
FIG. 2 illustrates an energy-band structure of a phosphor nanoparticle according to an embodiment of the present disclosure.

FIG. 2 illustrates the energy-band structure of the phosphor nanoparticle 10. The modifying organic compound 16 exhibits absorption in at least part of a wavelength range of about 300 nm or more and about 400 nm or less. When the phosphor nanoparticle 10 is irradiated with excitation light (first light) including a light component having a wavelength of about 300 nm or more and about 400 nm or less, the light component having a wavelength of about 300 nm or more and about 400 nm or less is partially absorbed by the modifying organic compound 16. This reduces the amount of ultraviolet radiation reaching the nanoparticle core 11. Thus, the nanoparticle core 11 is less likely to be degraded by irradiation with ultraviolet radiation. The luminous efficiency of the phosphor nanoparticle 10 is, therefore, less likely to decrease. The term "ultraviolet radiation" refers to light having a shorter wavelength than visible light and to light having a wavelength of about 400 nm or less.

A light component of the excitation light which is not absorbed by the modifying organic compound 16 is absorbed by at least one of the nanoparticle core 11 and the shell layer 13. Thus, an electron in the nanoparticle core 11 makes a transition from the valence band to the conduction band. After the transition and after a lapse of a certain period of time, when the electron returns from the conduction band to the valence band, light (second light) having a wavelength corresponding to a difference in energy between the level of the conduction band and the level of the valance band is generated (light emission of the phosphor nanoparticle 10).

As illustrated in FIG. 2, when the shell layer 13 has a larger band-gap energy than the nanoparticle core 11, the shell layer 13 contributes to the effect of confining excited carriers in the nanoparticle core 11, thereby increasing the luminous efficiency.

In this specification, the term "nanoparticle" refers to a particle having a diameter of several hundreds of picometers or more and several tens of micrometers or less. The diameter of the particle may be estimated by observing a lattice image in an image observed at high magnification with, for example, a scanning electron microscope or a transmission electron microscope.

Nanoparticle Core

The nanoparticle core 11 is composed of a compound semiconductor. The term "compound semiconductor" indicates a semiconductor in which two or more elements are covalently or ionically bonded.

The nanoparticle core 11 may be composed of a group 13-15 compound semiconductor. The term "group 13-15 compound semiconductor" refers to a semiconductor in which a group 13 element (B, Al, Ga, In, or Tl) and a group 15 element (N, P, As, Sb, or Bi) are ionically bonded. For example, the group 13-15 compound semiconductor used for the nanoparticle core 11 may be at least one of InN, InP, InGaN, InGaP, AlInN, AlInP, AlGaInN, and AlGaInP, and, particularly, at least one of InN, InP, InGaN, and InGaP.

The group 13-15 compound semiconductor used for the nanoparticle core 11 may unintentionally contain an impurity and may contain an intentionally added impurity in a concentration of about $1 \times 10^{16}$ cm$^{-3}$ or more and about $1 \times 10^{21}$ cm$^{-3}$ or less. In the case where an impurity is intentionally added to the group 13-15 compound semiconductor, any of group 2 elements (Be, Mg, Ca, Sr, and Ba), Zn, and Si may be used as a dopant. In particular, any of Mg, Zn, and Si may be used as a dopant among these elements.

The group 13-15 compound semiconductor has band-gap energy which absorbs the first light and which generates the second light (having a longer wavelength than the first light) to emit visible light. The emission wavelength of the nanoparticle core 11 may be adjusted to a freely-selected wavelength in the visible light region by controlling the average particle diameter of the nanoparticle core 11 or the composition of the mixed crystal in the nanoparticle core 11.

The group 13-15 compound semiconductor used for the nanoparticle core 11 may have a band-gap energy of about 1.8 eV or more and about 2.8 eV or less, depending on the emission wavelength of the phosphor nanoparticle 10. Specifically, in the case where the phosphor nanoparticle 10 is used as a red phosphor, the group 13-15 compound semiconductor may have a band-gap energy of about 1.85 eV or more and about 2.5 eV or less. In the case where the phosphor nanoparticle 10 is used as a green phosphor, the group 13-15 compound semiconductor may have a band-gap energy of about 2.3 eV or more and about 2.5 eV or less. In the case where the phosphor nanoparticle 10 is used as a blue phosphor, the group 13-15 compound semiconductor may have a band-gap energy of about 2.65 eV or more and about 2.8 eV or less.

The nanoparticle core 11 may have an average particle diameter two or less times the Bohr radius. The Bohr radius indicates extension of existence probability of an exciton and is represented by the following expression (1):

$$y = 4\pi \in \hbar^2 \cdot me^2 \qquad \text{expression (1)}$$

where y represents the Bohr radius, $\in$ represents a dielectric constant, h represents Planck's constant, m represents an effective mass, e represents the elementary electric charge.

In the case where the nanoparticle core 11 has an average particle diameter two or less times the Bohr radius, the phosphor nanoparticle 10 has very high emission intensity. Note that in the case where the nanoparticle core 11 has an average particle diameter two or less times the Bohr radius, the band gap of the group 13-15 compound semiconductor tends to extend because of a quantum size effect. Even in this case, the group 13-15 compound semiconductor used for the nanoparticle core 11 may have a band-gap energy of about 1.8 eV or more and about 2.8 eV or less. The diameter of the nanoparticle core 11 may be estimated by observing a lattice image in an image observed at high magnification with a transmission electron microscope.

The sum total of the average particle diameter of the nanoparticle core 11 and the thickness of the shell layer 13 (hereinafter, referred to as an "average particle diameter of the nanoparticle core 11 covered with the shell layer 13") is preferably about 0.1 nm or more and about 10 μm or less, more preferably about 0.5 nm or more and about 1 μm or less, and still more preferably about 1 nm or more and about 20 nm or less. In the case where the average particle diameter of the nanoparticle core 11 covered with the shell layer 13 is about 0.1 nm or more, the nanoparticle cores 11 is less likely to aggregate during the production of the phosphor nanoparticles 10. In the case where the average particle diameter of the nanoparticle core 11 covered with the shell layer 13 is about 10 μm or less, the excitation light is less likely to scatter at the surface layer of the nanoparticle core 11, so that the luminous efficiency of the phosphor nanoparticle 10 is much less likely to decrease.

Shell Layer

The shell layer 13 may be a compound semiconductor layer that inherits the crystal structure of the nanoparticle core 11. Specifically, the shell layer 13 may be a compound semiconductor layer formed by crystal growth on the outer surface of the nanoparticle core 11 using the nanoparticle core 11 as a nucleus for the growth. For example, atoms of a group 13 element or a group 15 element having dangling bonds are arranged on the outer surface of the nanoparticle core 11. The dangling bonds are chemically bound to atoms of elements contained in the shell layer 13.

The compound semiconductor used for the shell layer 13 may be at least one of group 13-15 compound semiconductors and group 12-16 compound semiconductors. In particular, the compound semiconductor used for the shell layer 13 may be a group 13-15 compound semiconductor. The group 13-15 compound semiconductor used for the shell layer 13 may be the same or different from the group 13-15 compound semiconductor used for the nanoparticle core 11 and may be at least one of, for example, GaAs, GaP, GaN, GaSb, InAs, InP, InN, InSb, AlAs, AlP, AlSb, and AlN. A group 12-16 compound semiconductor used for the shell layer 13 may be at least one of, for example, ZnO, ZnS, ZnSe, and ZnTe.

The thickness of the shell layer 13 may be determined in response to the average particle diameter of the nanoparticle core 11. For example, in the case where the nanoparticle core 11 has an estimated average particle diameter of about 2 to about 6 nm, the shell layer 13 may have a thickness of about 0.1 nm to about 10 nm. In the case where the shell layer 13 has a thickness of about 0.1 nm or more, the outer surface of the nanoparticle core 11 is sufficiently covered with the shell layer 13, so that the shell layer 13 uniformly protects the nanoparticle core 11. In the case where the shell layer 13 has a thickness of about 10 nm or less, the shell layer 13 has a uniform thickness, so that defects of the outer surface of the shell layer 13 are less likely to increase.

In particular, the shell layer 13 may have a thickness of about 5 nm or more and about 10 nm or less. In the case where the shell layer 13 has a thickness of about 5 nm or more, a distance from the outer surface of the nanoparticle core 11 to a π-conjugated structure of the modifying organic compound 16 is about 5 nm or more. This will be described below.

The thickness of the shell layer 13 may be estimated by observing a lattice image in an image observed at high magnification with a transmission electron microscope. The thickness of the shell layer 13 is proportional to the ratio of the number of particles of a material for the shell layer 13 to the number of particles of the nanoparticle core 11.

The structure of the shell layer 13 is not limited to a single-layer structure. The shell layer 13 may have a stacked structure including two or more layers. In the case where the shell layer 13 has a stacked structure, the nanoparticle core 11 may be covered with the shell layer 13. In the case where the shell layer 13 has a stacked structure, the thickness of the shell layer 13 is increased in proportion to the ratio of the number of particles of materials constituting the stacked structure to the number of particles of the nanoparticle core 11.

Modifying Organic Compound

The modifying organic compound 16 may exhibit absorption only in at least part of a wavelength range of about 300 nm or more and about 400 nm or less. The modifying organic compound 16 may have, in its molecule, a π-conjugated structure and a functional group to be bound to the outer surface of the shell layer 13.

The π-conjugated structure in the modifying organic compound 16 is capable of absorbing light having a wavelength of about 300 nm or more and about 400 nm or less. Thus, the modifying organic compound 16 exhibits absorption in at least part of a wavelength range of about 300 nm or more and about 400 nm or less.

The "π-conjugated structure" indicates a structure in which single bonds and double or triple bonds are alternately arranged. For example, the structure may contain an aromatic ring. The "aromatic ring" refers to a conjugated unsaturated ring structure in which the number of electrons in the π-electron system on the ring is 4n+2 (n represents an integer of zero or more). Examples of the aromatic ring include a benzene ring, a naphthalene ring, and an anthracene ring. Examples of the modifying organic compound 16 having the π-conjugated structure include anthracene and terphenyl. The π-conjugated structure may be a structure capable of partially absorbing light having a wavelength longer than about 400 nm, depending on the purpose.

The modifying organic compound 16 contains, in its molecule, the functional group to be bound to the outer surface of the shell layer 13. Thus, a dangling bond on the outer surface of the shell layer 13 is capped. This suppresses defects on the outer surface of the shell layer 13, thereby increasing the luminous efficiency of the nanoparticle core 11.

Examples of the functional group may include a thiol group, a phosphonic group, a carboxy group, an alkoxysilyl group, and a chlorosilyl group. Thus, the modifying organic compound 16 is bound to the outer surface of the shell layer 13 with, for example, a thiol bond, a phosphonic acid bond, an ester bond, or a siloxane bond.

In particular, a first functional group may be an alkoxysilyl group or a chlorosilyl group. In this case, the modifying organic compound 16 is bound to the outer surface of the shell layer 13 with a siloxane bond. Thus, the degradation of the nanoparticle core 11 due to irradiation with ultraviolet radiation is much less likely to occur.

Examples of the modifying organic compound having the π-conjugated structure and the functional group in its molecule include (9-phenanthrenyl)triethoxysilane, (1,1':4',1''-terphenyl)-4-thiol, anthracene-2-thiol, and (9-phosphono)anthracene.

The distance between the outer surface of the nanoparticle core 11 and the π-conjugated structure of the modifying organic compound 16 may be about 5 nm or more. When the modifying organic compound 16 absorbs light having a wavelength of about 300 nm or more and about 400 nm or less, carriers are generated. When the distance is about 5 nm or more, the generated carriers are less likely to move to the nanoparticle core 11 by tunneling. Thus, the degradation of the nanoparticle core 11 due to the carriers is less likely to occur. When the distance is about 10 nm or less, the size of the phosphor nanoparticle 10 is less likely to increase.

The "distance" refers to the distance between the outer surface of the nanoparticle core 11 and a portion of the π-conjugated structure of the modifying organic compound 16 adjacent to the nanoparticle core 11. The sentence the distance may be about 5 nm or more translates into the phrase "the sum total of the thickness of the shell layer 13 and the length of the first functional group in the thickness direction of the shell layer 13 may be about 5 nm or more". The distance may be estimated according to the following method. The thickness of the shell layer 13 may be estimated by observing a lattice image in an image observed at high magnification with a transmission electron microscope. The length of the first functional group of the modifying organic compound 16 in the thickness direction of the shell layer 13 may be estimated by simulation using, for example, quantum chemical calculation. The sum total of these values may provide an estimate of the distance.

Production of Phosphor Nanoparticle

A method for producing the phosphor nanoparticle 10 according to this embodiment is not particularly limited. A freely-selected production method may be employed. In view of a simple, low-cost method, a chemical synthetic method may be employed as a method for producing the phosphor nanoparticle 10. In the chemical synthetic method, a plurality of starting materials containing constituent elements of a target material are dispersed in a medium and then are allowed to react with each other to synthesize the target material. Examples of the chemical synthetic method include a sol-gel method (colloidal method), a hot-soap method, an inverse micelle method, a solvothermal method, a molecular precursor method, a hydrothermal synthesis method, and a flux method. From the viewpoint of producing a nanoparticle core composed of a compound semiconductor material, the hot-soap method may be employed. An example of a method for producing the phosphor nanoparticle 10 by the hot-soap method will be described below.

The nanoparticle core 11 is synthesized in a liquid phase. For example, in the case where the nanoparticle core 11 composed of InN is produced, 1-octadecene (solvent for synthesis is charged in a flask or the like. Tris(dimethylamino) indium and hexadecanethiol (HDT) are added thereto. The mixture is sufficiently stirred and then reacted at 180° C. to 500° C., thereby yielding the nanoparticle core 11 composed of InN. HDT is bound to the phosphor sheet of the nanoparticle core 11. Alternatively, after the growth of the shell layer 13, HDT may be added.

The solvent for synthesis by the hot-soap method may be a solvent composed of a compound including carbon atoms and hydrogen atoms (hereinafter, referred to as a "hydrocarbon solvent"). In this case, the solvent for synthesis is less likely to be contaminated with water or oxygen. Thus, the nanoparticle core 11 is less likely to be oxidized. Examples of the hydrocarbon solvent may include n-pentane, n-hexane, n-heptane, n-octane, cyclopentane, cyclohexane, cycloheptane, benzene, toluene, o-xylene, m-xylene, and p-xylene.

In the hot-soap method, in principle, a longer reaction time results in the nanoparticle core 11 having a larger particle diameter. Thus, the size of the nanoparticle core 11 may be controlled to a desired size by performing the liquid-phase synthesis while the particle diameter is monitored by, for example, photoluminescence, light absorption, or dynamic light scattering.

A reagent serving as a raw material for the shell layer 13 is added to a solution containing the nanoparticle core 11. They are heated to react with each other, thereby yielding a starting material for a phosphor nanoparticle. Regarding the resulting starting material for the phosphor nanoparticle, the outer surface of the nanoparticle core 11 is covered with the shell layer 13, and HDT is bound to the outer surface of the shell layer 13.

The modifying organic compound 16 is added to the solution containing the starting material for the phosphor nanoparticle. They are reacted at room temperature to 300° C. This cleaves the bond between the outer surface of the nanoparticle core 11 and HDT, and then the modifying organic compound 16 is bound to the outer surface of the nanoparticle core 11. Thereby, the phosphor nanoparticle 10 according to this embodiment is produced.

When the nanoparticle core 11 is produced, the modifying organic compound 16 may be added in place of HDT. In the case where the phosphor nanoparticle 10 is produced as described above, the modifying organic compound 16 may not be added after the formation of the shell layer 13.

Optical Device

Figure 3:
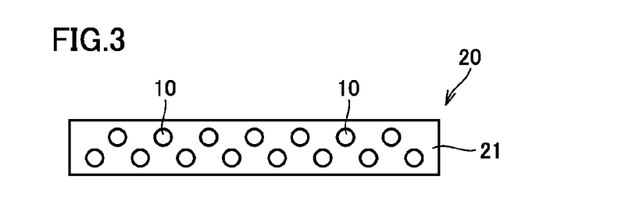
FIG. 3 is a cross-sectional view of a phosphor sheet including phosphor nanoparticles according to an embodiment of the present disclosure.

FIG. 3 is a cross-sectional view of a phosphor sheet 20 including the phosphor nanoparticles 10 according to this embodiment. The phosphor nanoparticles 10 according to this embodiment have excellent dispersibility. It is thus possible to disperse the phosphor nanoparticles 10 in a resin 21. In the phosphor nanoparticles 10 according to this embodiment, the degradation of the nanoparticle cores 11 due to irradiation with ultraviolet radiation is less likely to occur. It is thus possible to use the phosphor nanoparticles 10 according to this embodiment for various optical devices. As the resin 21, a photocurable resin may be used.

Specifically, the phosphor nanoparticles 10 may be arranged at a place irradiated with light including ultraviolet radiation (for example, sunlight). Thus, the phosphor nanoparticles 10 may be used as a wavelength conversion material for a solar cell. In the case where the phosphor nanoparticles 10 are used as a phosphor material for a display, a phosphor portion may be arranged at a position of the display irradiated with external light, thus leading to a high degree of flexibility in the design of a device. A photocurable resin may be used as the resin 21, thus leading to a high degree of flexibility in the production process of a device. The phosphor sheet 20 including the phosphor nanoparticles 10 may be used as a wavelength conversion material or a phosphor material.

In this specification, the "optical device" refers to a device including a light energy conversion section configured to absorb first light to generate second light (light having a longer wavelength than the first light). Examples of the optical device include liquid-crystal displays, light-emitting device (LED) luminaires, solar cells provided with wavelength conversion layers.

As described above, the phosphor nanoparticle 10 according to this embodiment includes the nanoparticle core 11 composed of a compound semiconductor, the shell layer 13 that covers the nanoparticle core 11, and the modifying organic compound 16 bound to the outer surface of the shell layer 13. The modifying organic compound 16 exhibits absorption in at least part of a wavelength range of about 300 nm or more and about 400 nm or less. The modifying organic compound 16 may exhibit absorption only in at least part of a wavelength range of about 300 nm or more and about 400 nm or less. In this case, the phosphor nanoparticles 10 are less likely to aggregate and have excellent luminous efficiency.

The modifying organic compound 16 may have a π-conjugated structure in its molecule. The π-conjugated structure may contain an aromatic ring. In this case, the modifying organic compound 16 exhibits absorption in at least part of a wavelength range of about 300 nm or more and about 400 nm or less.

The distance between the outer surface of the nanoparticle core 11 and the π-conjugated structure of the modifying organic compound 16 may be about 5 nm or more. In this case, although carriers are generated when the modifying organic compound 16 absorbs light having a wavelength of about 300 nm or more and about 400 nm or less, the carriers are less likely to move to the nanoparticle core 11 by tunneling.

The modifying organic compound 16 may be bound to the outer surface of the shell layer 13 with a siloxane bond. In this case, the phosphor nanoparticle having higher luminous efficiency is provided.

The compound semiconductor may be a first group 13-15 compound semiconductor. The shell layer 13 may contain the first group 13-15 compound semiconductor or a group 13-15 compound semiconductor different from the first group 13-15 compound semiconductor. The compound semiconductor may absorb the first light to generate light having a longer wavelength than the first light. In this case, the effect of the present disclosure is effectively provided.

EXAMPLES

While the present disclosure will be described in more detail below by examples, the present disclosure is not limited to these examples.

Example 1

Figure 4:
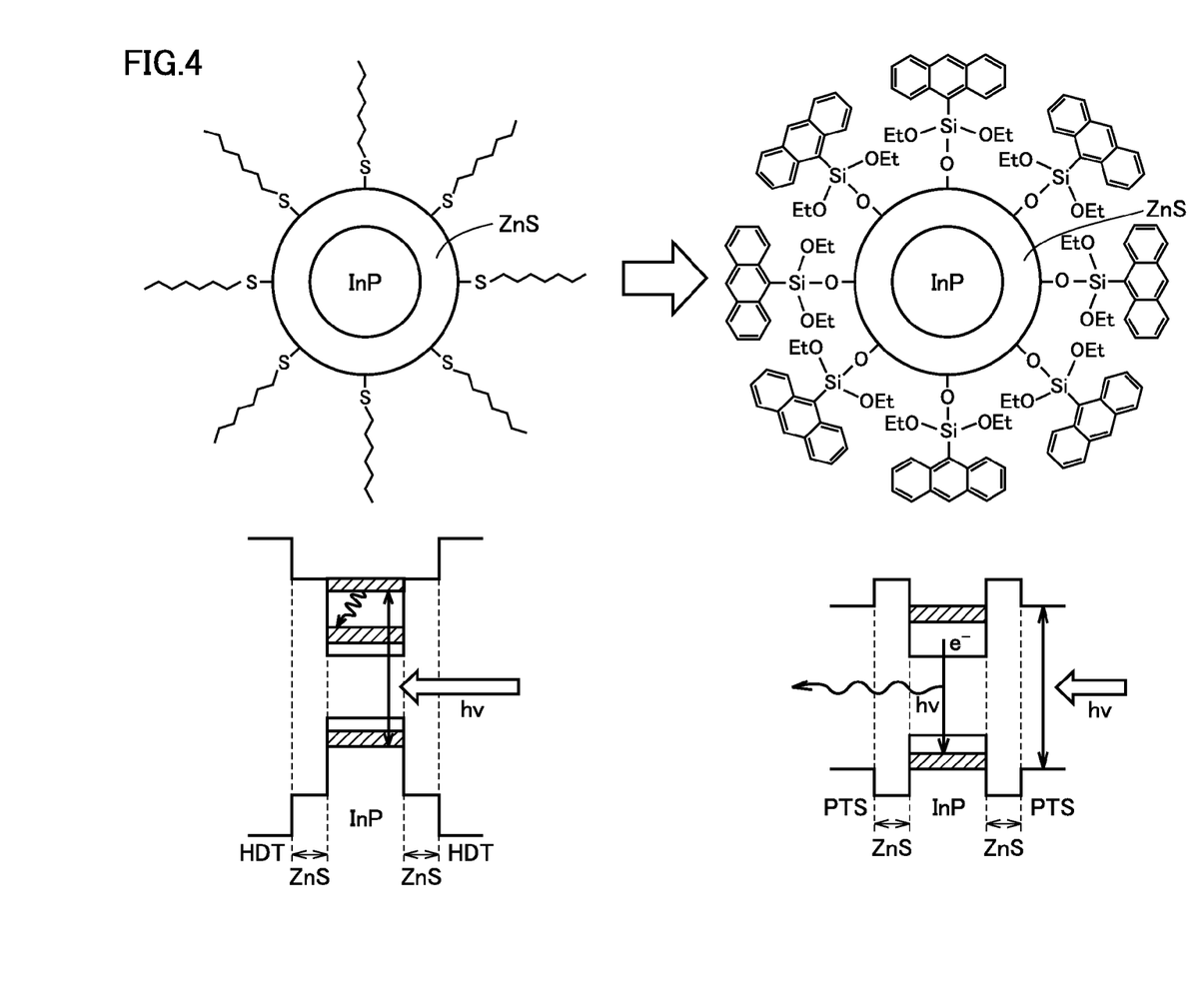
FIG. 4 illustrates structures and energy-band structures of phosphor nanoparticles according to Example 1.

In Example 1, a phosphor nanoparticle including a nanoparticle core composed of InP, a shell layer composed of ZnS, and (9-phenanthrenyl)triethoxysilane (PTS) serving as a modifying organic compound was produced, and the quantum efficiency was measured. FIG. 4 illustrates the structure and the energy-band structure of the phosphor nanoparticle in Example 1. In FIG. 4, HDT is simplified. The symbol "Et" in FIG. 4 represents an ethyl group ($C_2H_5$—). The same is true in FIGS. 5 and 8. Hereinafter, a structure in which A is covered with B is expressed as "A/B". Thus, the phosphor nanoparticle according to this example is also expressed as "InP/ZnS/PTS".

A toluene solution containing a starting material (left in FIG. 4) for a phosphor nanoparticle was prepared, the starting material including a nanoparticle core composed of InP, a shell layer composed of ZnS, and HDT. HDT was bound to the outer surface of the shell layer.

PTS was added to the toluene solution in an amount of 5 mol with respect to 1 mol of the starting material for the phosphor nanoparticle. PTS was allowed to react with the starting material for the phosphor nanoparticle at 70° C. for 3 hours in a nitrogen atmosphere. Thereby, HDT was removed from the outer surface of the shell layer, and PTS, which absorbs light having a wavelength of about 350 nm or less), was bound to the outer surface of the shell layer.

Subsequently, washing treatment was performed with an organic solvent. Thereby, HDT that had been removed from the outer surface of the shell layer and unreacted PTS were removed from the toluene solution. Drying treatment was then performed to give a phosphor nanoparticle according to this example (right in FIG. 4).

With respect to the starting material for the phosphor nanoparticle and the phosphor nanoparticle according to this example, the quantum efficiency was measured. Thereafter, the starting material for the phosphor nanoparticle and the phosphor nanoparticle according to this example were continuously irradiated with ultraviolet radiation for 1 hour, and then the quantum efficiency was measured. In the case of the starting material for the phosphor nanoparticle, the quantum efficiency after irradiation with ultraviolet radiation was 70% of the quantum efficiency before irradiation with ultraviolet radiation. In contrast, in the case of the phosphor nanoparticle according to this example, the quantum efficiency after irradiation with ultraviolet radiation was 91% of the quantum efficiency before irradiation with ultraviolet radiation. The results demonstrated that in the phosphor nanoparticle according to this example, the degradation of the nanoparticle core due to irradiation with ultraviolet radiation was inhibited.

A possible reason for the results is as follows: HDT contained in the starting material for the phosphor nanoparticle (left in FIG. 4) does not absorb ultraviolet radiation. Thus, when the starting material for the phosphor nanoparticle is irradiated with ultraviolet radiation, ultraviolet radiation is not absorbed by HDT and so forth. As a result, the nanoparticle core is exposed to ultraviolet radiation. In contrast, when the phosphor nanoparticle according to this example (right in FIG. 4) is irradiated with ultraviolet radiation, PTS absorbs part of the ultraviolet radiation. Thus, the amount of ultraviolet radiation reaching the nanoparticle core is reduced. As a result, in the phosphor nanoparticle according to this example, the degradation of the nanoparticle core due to irradiation with ultraviolet radiation was inhibited.

Example 2

Figure 5:
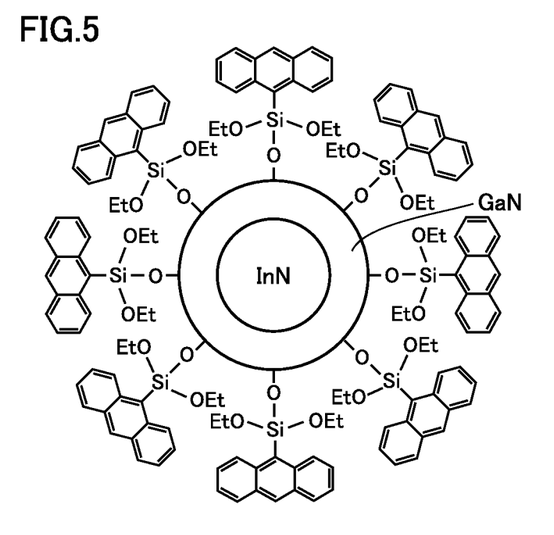
FIG. 5 is a schematic cross-sectional view of the structure of a phosphor nanoparticle according to Example 2.

In Example 2, a phosphor nanoparticle was produced according to the method described in Example 1, except that the nanoparticle core was composed of InN and that the shell layer was composed of GaN. FIG. 5 illustrates a schematic cross-sectional view of the structure of a phosphor nanoparticle according to this example.

Tris(dimethylamino)indium was pyrolyzed in a 1-octadecene solution containing HDT in such a manner that the molar ratio of tris(dimethylamino)indium to HDT was 1:2. Thereby, a nanoparticle core composed of InN was prepared.

A 1-octadecene solution containing tris(dimethylamino) gallium was added to a 1-octadecene solution containing the nanoparticle core in such a manner that the molar ratio of tris(dimethylamino)gallium to tris(dimethylamino)indium was 7:1. A reaction was performed to provide a starting material for a phosphor nanoparticle, the starting material being composed of InN/GaN/HDT.

Subsequently, PTS was added to the resulting mixture in an amount of 5 mol with respect to 1 mol of tris(dimethylamino) indium. A reaction was performed at 70° C. for 3 hours to replace HDS with PTS, thereby yielding a phosphor nanoparticle (phosphor nanoparticle according to this example) composed of InN/GaN/PTS.

The quantum efficiency was measured according to the method described in Example 1. In the case of the starting material for the phosphor nanoparticle, the quantum efficiency after irradiation with ultraviolet radiation was 60% of the quantum efficiency before irradiation with ultraviolet radiation. In contrast, in the case of the phosphor nanoparticle according to this example, the quantum efficiency after irradiation with ultraviolet radiation was 89% of the quantum efficiency before irradiation with ultraviolet radiation. The results demonstrated that even in the case where the nanoparticle core was composed of InN and where the shell layer was composed of GaN, the degradation of the nanoparticle core due to irradiation with ultraviolet radiation was inhibited. A possible reason for the results is the same as that described in Example 1.

Example 3

Figure 6:
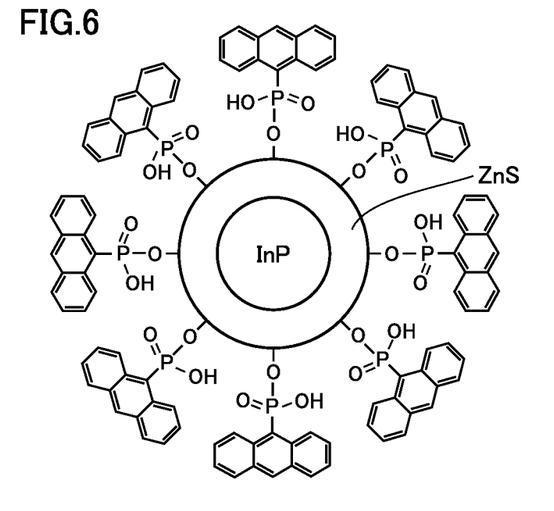
FIG. 6 is a schematic cross-sectional view of the structure of a phosphor nanoparticle according to Example 3.

In Example 3, a phosphor nanoparticle was produced according to the method described in Example 1, except that the modifying organic compound was (9-phosphono)anthracene (PA) and that the reaction temperature of the shell layer and PA was 120° C. Thereby, the phosphor nanoparticle illustrated in FIG. 6 was produced. FIG. 6 is a schematic cross-sectional view of the structure of the phosphor nanoparticle according to this example. PA absorbs light having a wavelength of about 350 nm or less.

The quantum efficiency was measured according to the method described in Example 1. In the case of the starting material for the phosphor nanoparticle, the quantum efficiency after irradiation with ultraviolet radiation was 70% of the quantum efficiency before irradiation with ultraviolet radiation. In contrast, in the case of the phosphor nanoparticle according to this example, the quantum efficiency after irradiation with ultraviolet radiation was 85% of the quantum efficiency before irradiation with ultraviolet radiation. The results demonstrated that even in the case where the modifying organic compound was PA, the degradation of the nanoparticle core due to irradiation with ultraviolet radiation was inhibited. A possible reason for the results is the same as that described in Example 1.

Table 1 describes the results of the comparison of Example 1 and this example. As is clear from Table 1, the degradation of the nanoparticle core due to irradiation with ultraviolet radiation in Example 1 was more inhibited than this example. A possible reason for this is that in this example, PA was bound to the outer surface of the shell layer with a phosphonic acid bond, whereas in Example 1, PTS was bound to the outer surface of the shell layer with a siloxane bond. From the results, the modifying organic compound may be bound to the outer surface of the shell layer with the siloxane bond.

TABLE 1

| | Nanoparticle core/shell layer | Modifying organic compound | Starting material for phosphor nanoparticle | | Phosphor nanoparticle | |
|---|---|---|---|---|---|---|
| | | | Structure | Quantum efficiency (%) | Structure | Quantum efficiency (%) |
| Example 1 | InP/ZnS | PTS (silane based) | InP/ZnS/HDT | 70 | InP/ZnS//PTS | 91 |
| Example 3 | InP/ZnS | PA (phosphonic acid based) | InP/ZnS/HDT | 70 | InP/ZnS/PA | 85 |

Example 4

Figure 7:
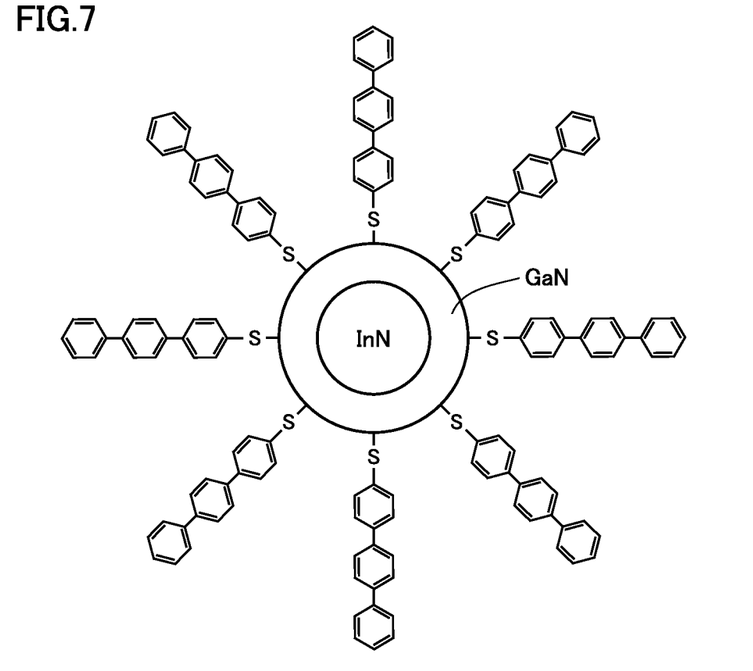
FIG. 7 is a schematic cross-sectional view of the structure of a phosphor nanoparticle according to Example 4.

In Example 4, a phosphor nanoparticle was produced according to the method described in Example 2, except that (1,1':4',1''-terphenyl)-4-thiol (TPT) was used in place of HDT and that the substitution reaction of HDT for PTS was not performed. As illustrated in FIG. 7, the phosphor nanoparticle including TPT serving as a modifying organic compound was produced. FIG. 7 is a schematic cross-sectional view of the structure of the phosphor nanoparticle according to this example. TPT absorbs light having a wavelength of about 380 nm or less.

The quantum efficiency was measured according to the method described in Example 1. In the case of the phosphor nanoparticle according to this example, the quantum efficiency after irradiation with ultraviolet radiation was 81% of the quantum efficiency before irradiation with ultraviolet radiation. The results demonstrated that even in the case where the modifying organic compound was TPT, the degradation of the nanoparticle core due to irradiation with ultraviolet radiation was inhibited. A possible reason for the results is the same as that described in Example 1.

Figure 8:
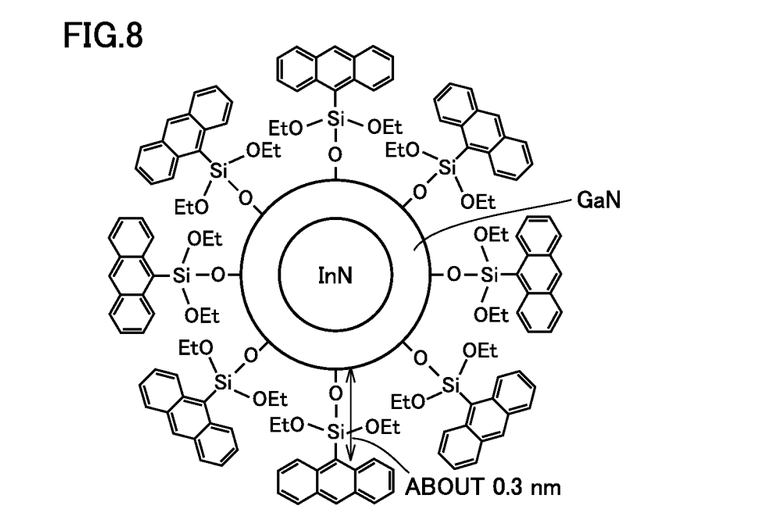
FIG. 8 is a schematic cross-sectional view of the structure of a phosphor nanoparticle according to Example 5.

Table 2 describes the results of the comparison of Example 2 and this example. As is clear from Table 2, the degradation of the nanoparticle core due to irradiation with ultraviolet radiation in Example 2 was more inhibited than this example. A possible reason for this is that in this example, TPT was bound to the outer surface of the shell layer with a thiol bond, whereas in Example 2, PTS was bound to the outer surface of the shell layer with a siloxane bond. From the results, the modifying organic compound may be bound to the outer surface of the shell layer with the siloxane bond.

of the nanoparticle core and tris(dimethylamino)gallium was halved. Thereby, the phosphor nanoparticle as illustrated in FIG. 8 was produced. FIG. 8 is a schematic cross-sectional view of the structure of the phosphor nanoparticle according to this example.

The quantum efficiency was measured according to the method described in Example 1. In the case of the phosphor nanoparticle according to this example, the quantum efficiency after irradiation with ultraviolet radiation was 79% of the quantum efficiency before irradiation with ultraviolet radiation. The results demonstrated that even in the case where the reaction time of the nanoparticle core and the shell layer was changed, the degradation of the nanoparticle core due to irradiation with ultraviolet radiation was inhibited. A possible reason for the results is the same as that described in Example 1.

Table 3 describes the results of the comparison of Example 2 and this example. As is clear from Table 3, the degradation of the nanoparticle core due to irradiation with ultraviolet radiation in Example 2 was more inhibited than this example. A possible reason for this is as follows: Observation of a lattice image in an image observed at high magnification with a transmission electron microscope revealed that the shell layer in this example was about 4 nm, whereas the shell layer in Example 2 was about 9 nm. In each of Example 2 and this example, PTS was bound to the outer surface of the shell layer with the siloxane bond. The length of the siloxane bonding moiety in the radial direction of the shell layer is seemingly about 0.3 nm. Thus, the distance between the outer surface of the nanoparticle core and the π-conjugated structure is seemingly about 4.3 nm in this example. In Example 2, the distance is seemingly about 9.3 nm. This is presumably the reason the

TABLE 2

| | Nanoparticle core/shell layer | Modifying organic compound | Starting material for phosphor nanoparticle | | Phosphor nanoparticle | |
|---|---|---|---|---|---|---|
| | | | Structure | Quantum efficiency (%) | Structure | Quantum efficiency (%) |
| Example 2 | InN/GaN | PTS (silane based) | InN/GaN/HDT | 60 | InN/GaN//PTS | 89 |
| Example 4 | InN/GaN | TPT (thiol based) | — | — | InN/GaN/TPT | 81 |

Example 5

A phosphor nanoparticle was produced according to the method described in Example 2, except that the reaction time degradation of the nanoparticle core due to irradiation with ultraviolet radiation in Example 2 was more inhibited than this example. The results demonstrate that the distance between the outer surface of the nanoparticle core and the π-conjugated structure may be about 5 nm or more.

TABLE 3

| | Nanoparticle core/shell layer | Modifying organic compound | Starting material for phosphor nanoparticle | | Phosphor nanoparticle | | |
| | | | Structure | Quantum efficiency (%) | Structure | Distance[*1] (nm) | Quantum efficiency (%) |
|---|---|---|---|---|---|---|---|
| Example 2 | InN/GaN | PTS (silane based) | InN/GaN/HDT | 60 | InN/GaN//PTS | about 9.3 | 89 |
| Example 5 | InN/GaN | PTS (silane based) | InN/GaN/HDT | 60 | InN/GaN/PTS | about 4.3 | 79 |

Distance[*1]: distance between the outer surface of the nanoparticle core and the π-conjugated structure.

Example 6

In Example 6, the phosphor nanoparticles according to Example 1 were dispersed in an acrylic resin to produce a phosphor sheet.

The phosphor nanoparticles composed of InP/ZnS/PTS produced according to Example 1 were mixed with a photo-curable methacrylate-based resin material. The resin was cured by irradiation with ultraviolet radiation. Thereby, the phosphor sheet according to this example was produced.

In the case of the resulting phosphor sheet, the luminous efficiency was substantially equal to that before irradiation with ultraviolet radiation, and nonuniformity in color was low.

It should be understood that the embodiments and the examples disclosed herein are illustrative and not limitative in any respect. The scope of the present invention is defined by the terms of the claims, rather than the description of the embodiments above, and is intended to include any modifications within the scope and meaning equivalent to the terms of the claims.

The present disclosure contains subject matter related to that disclosed in Japanese Priority Patent Application JP 2013-232151 filed in the Japan Patent Office on Nov. 8, 2013, the entire contents of which are hereby incorporated by reference.

What is claimed is:

1. A phosphor nanoparticle comprising:
a nanoparticle core composed of a compound semiconductor;
a shell layer that covers the nanoparticle core; and
a modifying organic compound bound to the outer surface of the shell layer,
wherein the modifying organic compound exhibits absorption in at least part of a wavelength range of 300 nm or more and 400 nm or less.

2. The phosphor nanoparticle according to claim 1, wherein the modifying organic compound exhibits absorption only in at least part of a wavelength range of 300 nm or more and 400 nm or less.

3. The phosphor nanoparticle according to claim 1, wherein the modifying organic compound has a π-conjugated structure in its molecule.

4. The phosphor nanoparticle according to claim 3, wherein the π-conjugated structure contains an aromatic ring.

5. The phosphor nanoparticle according to claim 3, wherein a distance between the outer surface of the nanoparticle core and the π-conjugated structure is 5 nm or more.

6. The phosphor nanoparticle according to claim 1, wherein the modifying organic compound is bound to the outer surface of the shell layer with a siloxane bond.

7. The phosphor nanoparticle according to claim 1, wherein the compound semiconductor is a first group 13-15 compound semiconductor, and
the shell layer contains the first group 13-15 compound semiconductor or a group 13-15 compound semiconductor different from the first group 13-15 compound semiconductor.

8. An optical device comprising:
the phosphor nanoparticle according to claim 1.

* * * * *